United States Patent
Han et al.

(10) Patent No.: US 7,306,357 B2
(45) Date of Patent: Dec. 11, 2007

(54) LINE LIGHT SOURCE USING LIGHT EMITTING DIODE AND LENS AND BACKLIGHT UNIT USING THE SAME

(75) Inventors: Byung-Woong Han, Incheon-si (KR); Jong-Nam Lee, Anyang-si (KR); Young-Hee Park, Busan-si (KR); Sang-Hee Lee, Yongin-si (KR); Kyu-Seok Kim, Yongin-si (KR); Young-Bee Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 11/242,358

(22) Filed: Oct. 3, 2005

(65) Prior Publication Data

US 2006/0077686 A1  Apr. 13, 2006

(30) Foreign Application Priority Data

Oct. 12, 2004  (KR) ...................... 10-2004-0081338

(51) Int. Cl.
*F21V 7/04* (2006.01)

(52) U.S. Cl. ...................... 362/610; 362/84; 362/612; 362/628

(58) Field of Classification Search ................ 362/610, 362/559, 612, 84, 608, 609, 621, 628, 26, 362/632, 27, 34; 385/50; 40/546, 547
See application file for complete search history.

(56) References Cited

U.S. PATENT DOCUMENTS

| | | | | |
|---|---|---|---|---|
| 5,711,592 | A * | 1/1998 | Hotta | 362/496 |
| 6,814,458 | B2 * | 11/2004 | Kim et al. | 362/632 |
| 2004/0100788 | A1 * | 5/2004 | Ju | 362/84 |
| 2005/0117320 | A1 * | 6/2005 | Leu et al. | 362/555 |

\* cited by examiner

*Primary Examiner*—Sandra O'Shea
*Assistant Examiner*—Bao Q. Truong
(74) *Attorney, Agent, or Firm*—Cantor Colburn LLP

(57) ABSTRACT

A line light source includes an illuminating bar having end portions opposite each other, and a light emitting diode disposed on each end portion of the illuminating bar. The end portions of the illuminating bar are each slant with respect to a vertical axis thereof at a predetermined slant angle. The illuminating bar includes a fluorescent material or a phosphorescent material.

18 Claims, 8 Drawing Sheets

LINE LIGHT SOURCE USING LIGHT EMITTING DIODE AND LENS AND BACKLIGHT UNIT USING THE SAME

This application claims priority to Korean Patent Application No. 10-2004-0081338, filed on Oct. 12, 2004 and all the benefits accruing therefrom under 35 U.S.C. §119, and the contents of which in their entirety are herein incorporated by reference.

BACKGROUND OF THE INVENTION (a) Field of the Invention

The present invention relates to a light source for a device displaying images.

(b) Description of the Related Art

Devices for displaying images, such as television receivers, computer monitors or the like, are classified into self-luminescence display devices capable of self-emitting and light receiving display devices necessitating a separate light source. Light emitting diode (LED), electroluminescence (EL), vacuum fluorescent display (VFD), field emission display (FED), and plasma display panel (PDP) devices, etc. are included in the self-luminescence display device category, while liquid crystal display (LCD) devices, etc. are included in the light receiving display device category.

Generally, an LCD device includes a pair of panels individually having electrodes on their inner surfaces, and a dielectric anisotropy liquid crystal layer interposed between the panels. In the LCD device, a variation of the voltage difference between the field generating electrodes, i.e., a variation in the strength of an electric field generated by the electrodes, changes the transmittance of light passing through the liquid crystal layer, and thus desired images are obtained by controlling the voltage difference between the electrodes.

In the LCD device, the light may be natural light or artificial light emitted from a light source separately employed in the LCD device.

A backlight unit is a representative device for providing the artificial light to the LCD device. Light emitting diodes (LEDs) or fluorescent lamps such as cold cathode fluorescent lamps (CCFLs), external electrode fluorescent lamps (EEFLs), etc. may be utilized as a light source of the backlight unit.

The LED has eco-friendly characteristics since it dose not use mercury (Hg) and its working lifetime is longer than the lifetimes of most other light sources due to its stable characteristics. For at least these reasons, the LED may be used as a next-generation light source.

However, the light emitted from the LED tends to be condensed to a substantially narrow area. For applying such an LED to a surface light source, therefore, a technique that is capable of distributing the light from the LED to a wider region is required in this field. For this reason, a space only used for uniformly distributing such a light may be further provided in the device. In a direct-type backlight, such a space may increase the thickness of the backlight, while forming a dead space at both sides of the LCD panel in an edge-type backlight. As a result, it may be incongruent to apply such a space to designs for fabricating compact, slim, and light LCD devices.

BRIEF SUMMARY OF THE INVENTION

The technical objective of the present invention is to reduce a dead space in an edge-type backlight unit using LEDs as a light source.

To achieve the objective, the present invention utilizes an illuminating bar having LEDs on end portions thereof.

In more detail, according to an aspect of the present invention, there is provided a line light source comprising: an illuminating bar having end portions opposite to each other in a longitudinal direction of the illuminating bar; and a light emitting diode disposed on each end portion of the illuminating bar, wherein the end portions of the illuminating bar are each slant with respect to a vertical axis thereof at a predetermined slant angle.

In this structure, the slant angle is formed between a surface of each end portion of the illuminating bar and the vertical axis of the illuminating bar and may be obtained by the equation of $\sin^{-1}(S/L)$, where L is a longitudinal length of the illuminating bar and S is a cross-sectional length of the illuminating bar.

Fluorescent or phosphorescent material may be included in the illuminating bar and distributed substantially uniformly throughout the entire illuminating bar. In another embodiment, the fluorescent or phosphorescent material may be more densely concentrated at a central portion of the illuminating bar, while being more sparsely concentrated in a direction away from the central portion.

The illuminating bar may have a shape of a quadrangular pole, and the end portions each may protrude like a triangular prism-shaped ear.

According to another aspect of the present invention, there is provided a line light source comprising: an illuminating bar having end portions opposite to each other; and a light emitting diode disposed on each end portion of the illuminating bar, wherein fluorescent or phosphorescent material is included in the illuminating bar and is more densely concentrated at a central portion of the illuminating bar, while being more sparsely concentrated in a direction away from the central portion.

In this structure, the end portions of the illuminating bar may be formed to slant with respect to a vertical axis thereof at a predetermined slant angle. In this case, the slant angle between a surface of each end portion of the illuminating bar and the vertical axis of the illuminating bar may be obtained by the equation of $\sin^{-1}(S/L)$, where L is a longitudinal length of the illuminating bar and S is a cross-sectional length of the illuminating bar.

According to still another aspect of the present invention, there is provided a backlight unit comprising: an illuminating bar having end portions opposite each other; a light emitting diode disposed on each end portion of the illuminating bar; a cover for receiving the illuminating bar and the light emitting diode; and a light guiding plate disposed adjacent to the illuminating bar, the light guide plate having a side in contact with one side of the illuminating bar.

The backlight unit may further comprise a wire disposed on an outer side of the cover for supplying a power to the light emitting diodes. The wire may be connected to the light emitting diode through a wiring slit formed at an end part of the cover.

Fluorescent or phosphorescent material included in the illuminating bar may be more densely concentrated at a central portion of the illuminating bar, while being more sparsely concentrated in a direction away from the central portion.

The cover reflects the light emitted from the illuminating bar back toward the light guiding plate.

BRIEF DESCRIPTION OF THE DRAWINGS

The above and other objects and advantages of the present invention will become more apparent by describing the exemplary embodiments thereof in more detail with reference to the accompanying drawings.

DETAILED DESCRIPTION OF THE INVENTION

Figure 1:
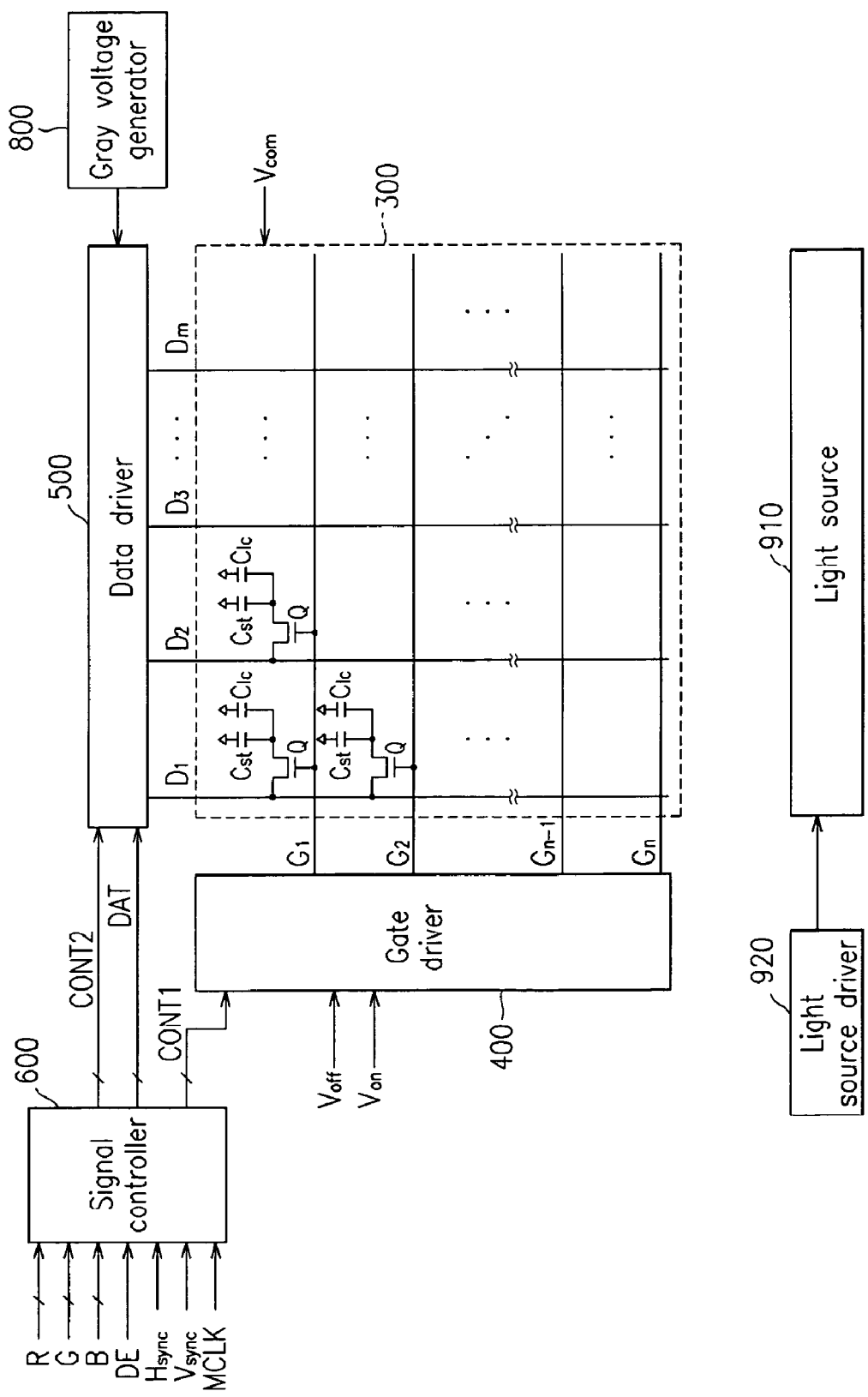
FIG. 1 is a block view of an exemplary embodiment of an LCD device according to the present invention.

Exemplary embodiments of the present invention will now be described more fully hereinafter with reference to the accompanying drawings, in which exemplary embodiments of the invention are shown. The present invention may, however, be embodied in different forms and should not be construed as being limited to the exemplary embodiments set forth herein. Rather, these exemplary embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a driving system of a light source device for a display device according to exemplary embodiments of the present invention will be described in detail with reference to the accompanying drawings.

Figure 2:
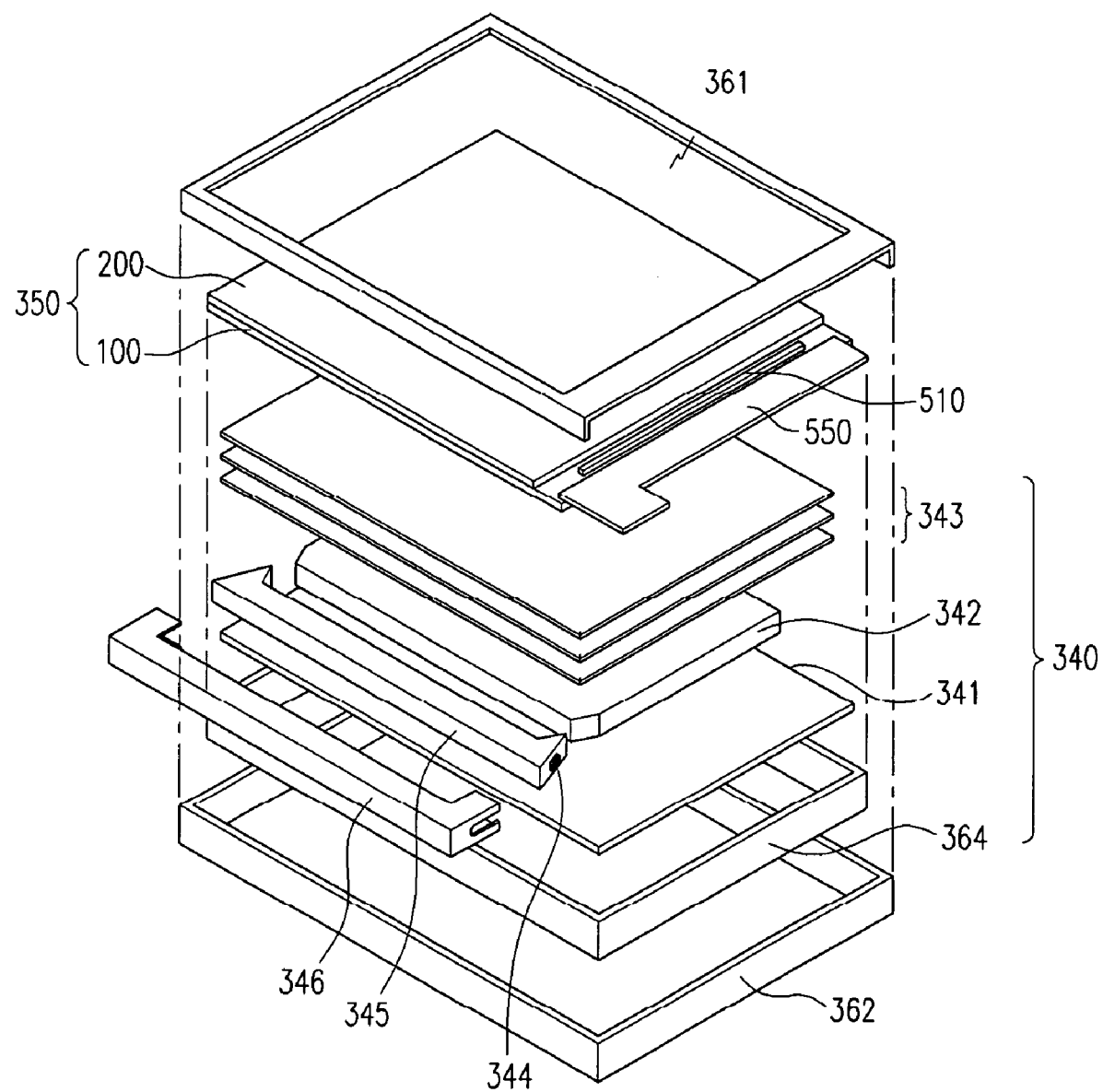
FIG. 2 is an exploded perspective view schematically illustrating an exemplary embodiment of an LCD device according to the present invention.
Figure 3:
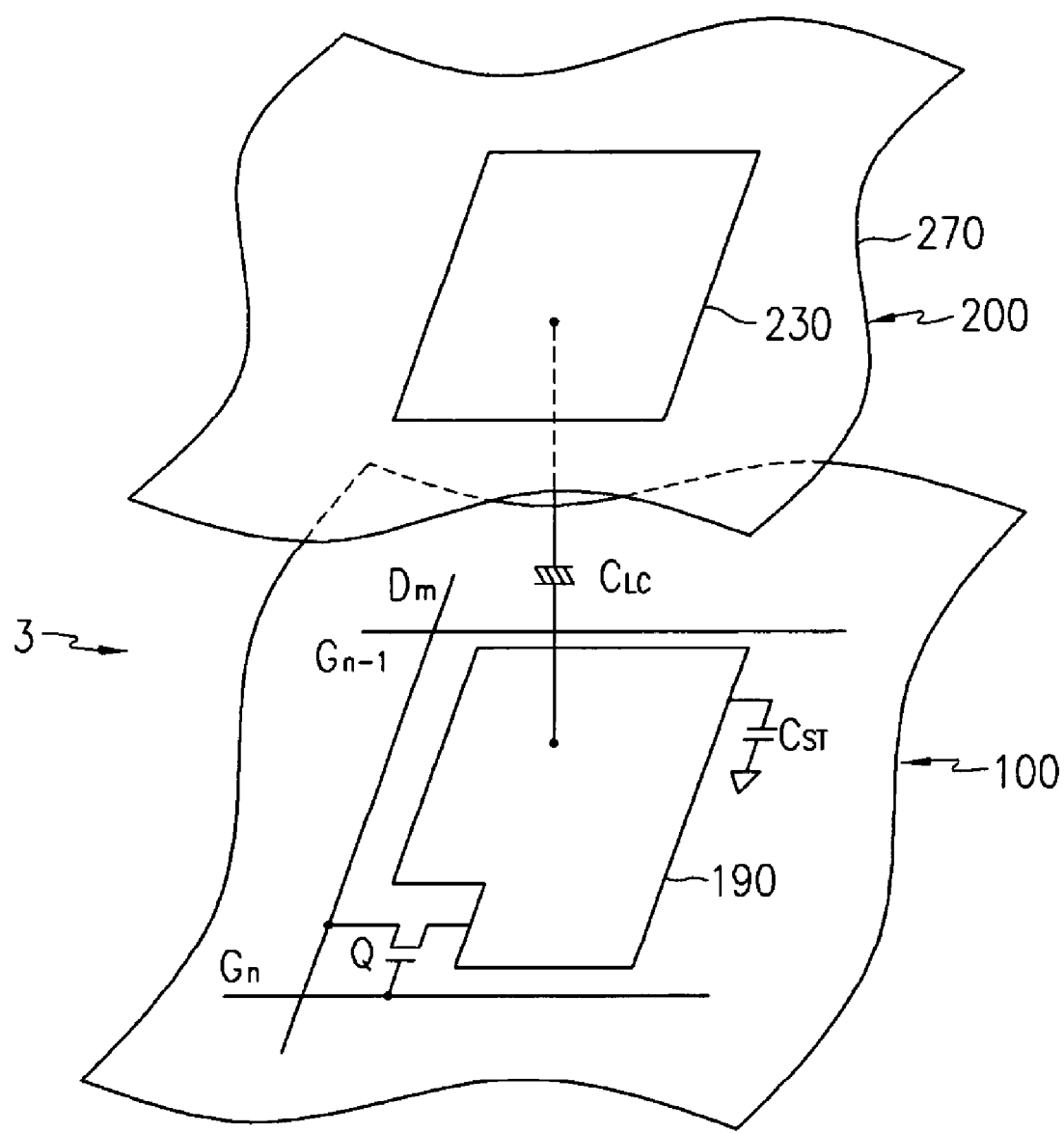
FIG. 3 is an equivalent circuit view of an exemplary embodiment of a pixel unit of an LCD device according to the present invention.

FIG. 1 is a block diagram of an exemplary embodiment of an LCD device according to the present invention, FIG. 2 is an exploded perspective view schematically illustrating an exemplary embodiment of an LCD device according to the present invention, and FIG. 3 is an equivalent circuit view of an exemplary embodiment of a pixel unit of an LCD device according to the present invention.

Referring to FIG. 1, an exemplary embodiment of an LCD device according to the present invention comprises an LC panel assembly 300, a gate driver 400 and a data driver 500 which are connected to the LC panel assembly 300. The LCD device also comprises a gray voltage generator 800 connected to the data driver 400, a light source section 910 for supplying the light to the LC panel assembly 300, a light source driver 920 for controlling the light source section 910, and a signal controller 600 for controlling the gate driver 400 and the data driver 500.

Referring to FIG. 2, the LCD device according to an exemplary embodiment of the present invention comprises a display unit and a backlight unit 340, a front housing 361 and a rear housing 362 for receiving and supporting a mold frames 364.

The display unit includes the LC panel assembly, 350, a gate tape carrier package (TCP) and a data TCP 510 which are attached to the LC panel assembly 300, and a gate printed circuit board (PCB) and a data PCB 550 which are individually attached to the corresponding TCPs 510.

In the structure shown in FIG. 2 and FIG. 3, the LC panel assembly 300 includes a lower panel 100 and an upper panel 200 facing each other, and an LC layer 3 interposed therebetween. In an equivalent circuit shown in FIG. 1 and FIG. 3, the LC panel assembly 300 includes a plurality of display signal lines $G_1$-$G_n$ and $D_1$-$D_m$ and a plurality of pixels connected thereto and arranged substantially in a matrix.

The display signal lines $G_1$-$G_n$ and $D_1$-$D_m$ are provided on the lower panel 100 and include a plurality of gate lines $G_1$-$G_n$ for transmitting gate signals (also referred to as "scanning signals"), and a plurality of data lines $D_1$-$D_m$ for transmitting data signals. The gate lines $G_1$-$G_n$ extend substantially in a row direction of the LC panel assembly 300 and substantially parallel to each other. The data lines $D_1$-$D_m$ extend substantially in a column direction of the LC panel assembly 300 and substantially parallel to each other.

In an exemplary embodiment, each pixel includes a switching element Q which is connected to corresponding ones of the display signal lines $G_1$-$G_n$ and $D_1$-$D_m$, an LC capacitor $C_{LC}$, and a storage capacitor $C_{ST}$. The LC and storage capacitors $C_{LC}$ and $C_{ST}$ are electrically connected to the switching element Q. In an alternative exemplary embodiment, the storage capacitor $C_{ST}$ may be omitted.

The switching element Q, which may be a thin film transistor (TFT), is provided on the lower panel 100. The switching element Q has three terminals: a control terminal connected to one of the gate lines $G_1$-$G_n$; an input terminal connected to one of the data lines $D_1$-$D_m$; and an output terminal connected to both of the LC capacitor $C_{LC}$ and the storage capacitor $C_{ST}$.

In an exemplary embodiment, the LC capacitor $C_{LC}$ includes a pixel electrode 190 provided on the lower panel 100 and a common electrode 270 provided on the upper panel 200 as two terminals. The LC layer 3 interposed between the two electrodes 190 and 270 functions as a dielectric of the LC capacitor $C_{LC}$. The pixel electrode 190 is connected to the switching element Q, and the common electrode 270 is supplied with a common voltage, and may cover the entire surface of the upper panel 200. In an alternative exemplary embodiment, the common electrode 270 may be provided on the lower panel 100. In this case, at least one of the pixel electrode 190 and the common electrode 270 may have a bar or stripe shape or the like.

The storage capacitor $C_{ST}$ is an auxiliary capacitor for the LC capacitor $C_{LC}$. When the pixel electrode 190 and a separate signal line (not shown) provided on the lower panel 100 overlap each other, interposing an insulator therebetween, the overlap portion forms the storage capacitor $C_{ST}$. The separate signal line may be supplied with a predetermined voltage such as the common voltage. Alternately, the storage capacitor $C_{ST}$ may be formed by overlapping the pixel electrode 190 and a previous gate line which is placed directly before the pixel electrode 190, interposing an insulator therebetween.

In an exemplary embodiment, for a color display, each pixel may uniquely exhibit one of three primary colors (i.e., spatial division), or sequentially exhibit three primary colors in turn depending on time (i.e., temporal division), so that a spatial or temporal sum of the primary colors is recognized as a desired color. FIG. 3 shows an example of the spatial division in which each pixel includes a color filter 230 for exhibiting one of the primary colors in an area of the upper panel 200 corresponding to the pixel electrode 190. In an alternative exemplary embodiment, the color filter 230 may be provided on or under the pixel electrode 190 of the lower panel 100.

Referring to FIG. 2, the backlight unit 340 is mounted under the LC panel assembly 350. The backlight unit 340 comprises light emitting diodes (LEDs) 344 disposed on each end of a bar-shaped illuminating bar 345, a cover 346 for receiving the illuminating bar 345 and the LEDs 344 therein to protect them, and a light guiding plate 342 and a plurality of optical sheets 343 which are provided under the LC panel assembly 350 for dispersing the light emitted from the illuminating bar 345 to the LC panel assembly 350. The illuminating bar 345 has end portions, and one or more LEDs may be mounted on at least one of the end portions of the illuminating bar 345. In this exemplary embodiment, the LEDs are mounted on both the end portions of the illuminating bar 345.

The backlight unit 340 may also comprise a reflecting plate 341 which is placed under the light guiding plate 342 and reflects the light downward, deviating from the light guiding plate 342 back toward the LC panel assembly 350. The backlight unit 340 may also comprise a mold frame 364 for receiving the light guiding plate 342, the illuminating bar 345 having the LEDs 344 thereon, and the cover 346.

In an exemplary embodiment, the LEDs 344 may emit various types of light including, but not limited to, ultraviolet light, blue light, and red light, or a mixed light thereof. In an alternative exemplary embodiment, the LEDs 344 may be white LEDs that emit white light by coating fluorescent materials corresponding to the primary colors on the LED chips emitting any one of the ultraviolet light, blue light, and red light, or a mixed light thereof.

In an exemplary embodiment, the illuminating bar 345 may be formed by distributing the fluorescent material in a transparent material such as resin in a solid form for maintaining a uniform shape. The illuminating bar 345 converts the ultraviolet light, etc. emitted from the LEDs 344 into the white light and then emits it.

Polarizers (not shown) may be provided on the outer surfaces of the two panels 100 and 200 for polarizing the light emitted from the light source units.

Referring to FIG. 1 and FIG. 2, the gray voltage generator 800 is included in the data PCB 550 and generates two sets of a plurality of gray voltages related to the transmittance of the pixels. One set of the gray voltages may have a positive polarity with respect to the common voltage, while the other set may have a negative polarity with respect to the common voltage.

The gate drivers 400 are individually mounted on each gate TCP, having the shapes of integrated circuit (IC) chips, and are individually connected to the gate lines $G_1$-$G_n$ of the LC panel assembly 350 for transmitting the gate signals consisting of combinations of the gate-on voltage $V_{on}$ and the gate-off voltage $V_{off}$ input from an external device to the gate signal lines $G_1$-$G_n$.

The data drivers 500 are individually mounted on each data TCP 510, having the shapes of IC chips, and are individually connected to the data lines $D_1$-$D_m$ of the LC panel assembly 350 for transmitting the data voltages which are selected from the gray voltages supplied from the gray voltage generator 800, to the data signal lines $D_1$-$D_m$.

In another exemplary embodiment of the present invention, either or both of the gate driver 400 and the data driver 500 may be directly mounted on the lower panel 100 having a shape of an IC chip. In still another exemplary embodiment of the present invention, either or both the gate driver 400 or/and the data driver 500 may be integrated into the lower panel 100 along with the other elements. In the above cases, the gate PCB 450 or the gate TCP or both may be omitted.

The signal controller 600 may be included in the data PCB 550 or the gate PCB for controlling the operation of the gate driver 400 or the data driver 500.

Hereinafter, the operation of the above-mentioned LCD device will be described in further detail.

In an exemplary embodiment, the signal controller 600 receives input image signals R, G, and B and input control signals including, but not limited to, a vertical synchronizing signal $V_{sync}$, a horizontal synchronizing signal $H_{sync}$, a main clock MCLK, a data enable signal DE, etc. The input control signals may be received from an external graphic controller (not shown). In response to the input image signals R, G, and B and the input control signals, the signal controller 600 processes the image signals R, G, and B suitable for the operation of the LC panel assembly 300 and generates gate control signals CONT1 and data control signals CONT2. The signal controller 600 outputs the gate control signals CONT1 and the data control signals CONT2 to the gate driver 400 and the data driver 500, respectively.

The gate control signals CONT1 includes, but is not limited to, a vertical synchronizing start signal STV for informing of the beginning of a frame, a gate clock signal CPV for controlling the output time of the gate-on voltage $V_{on}$, and an output enable signal OE for defining the duration of the gate-on voltage $V_{on}$.

The data control signals CONT2 includes, but is not limited to, a horizontal synchronizing start signal STH for informing of the beginning of data transmission, a load signal LOAD for instructing to apply the data voltages to the data lines $D_1$-$D_m$, a reverse signal RVS for reversing the polarity of the data voltages with respect to the common voltage, and a data clock signal HCLK.

In response to the data control signals CONT2 from the signal controller 600, the data driver 500 receives the image data DAT for a row of the pixels from the signal controller 600, shifts the image data DAT, converts the image data DAT into analog data voltages selected from the gray voltages from the gray voltage generator 800, and then applies the data voltages to data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q. The data voltages applied to the data lines $G_1$-$G_n$ are applied to the corresponding pixel through the activated switching elements Q.

The difference between the data voltage applied to the pixel and the common voltage is represented as a voltage across the LC capacitor $C_{LC}$, referred to as a pixel voltage.

The LC molecules in the LC capacitor $C_{LC}$ have orientations depending on the magnitude of the pixel voltage. The LCD device displays images by applying voltages to the field-generating electrodes to generate an electric field in the LC layer, which determines orientations of LC molecules in the LC layer to adjust polarization of incident light.

The light source driver 920 controls current applied to the light source section 910 for switching the LED 344 of the light source section 910. The light source driver 920 may also control the brightness of the light emitted from the LED 344.

When the light emitted from the LED 344 passes through the LC layer 3, the polarization of the light is varied according to the orientations of the LC molecules. The polarizer converts the difference of the light polarization into a difference of light transmittance.

By repeating this procedure by a unit of the horizontal period (which is denoted by "1H" and equal to one period of the horizontal synchronizing signal $H_{sync}$, the data enable signal DE, and the gate clock CPV), all gate lines $G_1$-$G_n$ are sequentially supplied with the gate-on voltage $V_{on}$ during a frame, thereby applying the data voltages to all pixels. When the next frame starts after finishing one frame, the reverse control signal RVS applied to the data driver 500 is controlled such that the polarity of the data voltages is reversed with respect to that of the previous frame (which is referred to as "frame inversion"). The reverse control signal RVS may be also controlled such that the polarity of the data voltages flowing along a data line in one frame are reversed (for example, line inversion and dot inversion), or the polarity of the data voltages in one packet are reversed (for example, column inversion, and dot inversion).

Hereinafter, the light source section 910 according to an embodiment of the present invention will be described in detail with reference to FIG. 4.

Figure 4:
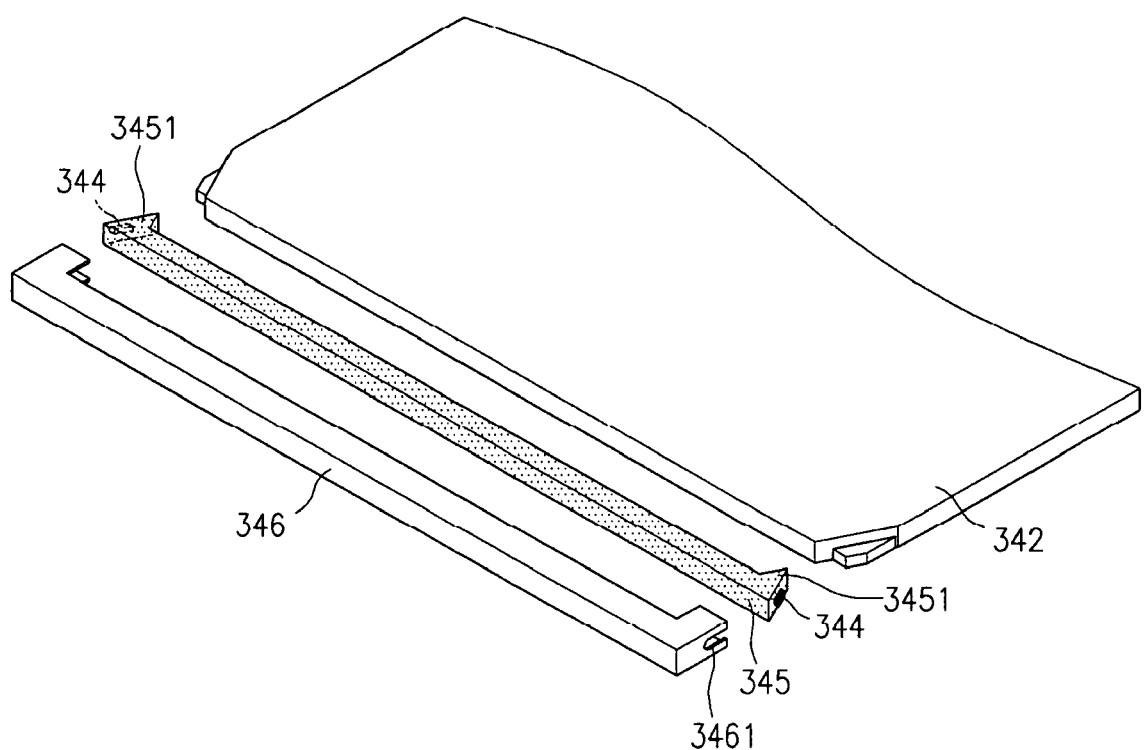
FIG. 4 is an exploded perspective view schematically illustrating an exemplary embodiment of a backlight unit according to the present invention.

FIG. 4 is an exploded perspective view schematically illustrating a backlight unit according to an exemplary embodiment of the present invention.

Referring to FIG. 4, a backlight unit comprises: a quadrangular pole-shaped illuminating bar 345 of which both ends protrude from the bar 345 like a triangular prism-shaped ear 3451; a light guiding plate 342, at one side of which the illuminating bar 345 is disposed; two LEDs 344 each adhering to the respective end portions of the illuminating bar 345; and a cover 346 which covers the illuminating bar 345, to which the two LEDs 344 adhere, to protect it and unite the illuminating bar 345 with the light guiding plate 342.

In an exemplary embodiment, the LEDs 344 may emit only one of the ultraviolet light, blue light, and red light, or a mixed light thereof.

The illuminating bar 345 may be formed with a transparent dielectric and fluorescent or phosphorescent materials uniformly dispersed thereto. The fluorescent and phosphorescent materials may vary in response to the type of light emitted from the LED 344. When the light emitted from the LED 344 is the ultraviolet light, all of RGB fluorescent materials or RGB phosphorescent materials may be used. However, in another exemplary embodiment when the light emitted from the LED 344 is a blue light, only a yellow fluorescent material or phosphorescent material may be used. The fluorescent or phosphorescent materials may be used to convert the light emitted from the LED 344 to a white light.

Both the end portions of the illuminating bar 345 may be formed to slant slightly with respect to a vertical axis of the illuminating bar 345. In an exemplary embodiment, the end portions may slant in a manner that a distance between the end portions becomes shorter as the distance is measured at a point nearer to the light guiding plate 342. In such a structure, much of the light emitted from the LEDs 344, which are attached to the end portions of the illuminating bar 345, is directed toward both sides of the cover 346. Accordingly, the light proceeding path in the illuminating bar 345 becomes longer and the light may have higher chances of colliding with the fluorescent materials within the illuminating bar 345. This may result in the fluorescent materials of the illuminating bar 345 being used more efficiently and uniformly.

In the structure described above, the illuminating bar 345 is configured so that a slant angle formed between one end thereof and its vertical axis satisfies the equation of $\sin^{-1}(S/L)$, where L is a longitudinal length of the illuminating bar 345 and S is a cross-sectional length thereof.

In an exemplary embodiment, the ear-shaped protrusions 3451 of the illuminating bar 345 may be joined with partially cut off corners of the light guiding plate 342 and serve as a means for expanding the space for attaching the LEDs 344 at both the end portions of the illuminating bar 345. In alternative embodiments, the ear-shaped protrusions 3451 may be omitted.

When the light emitted from the LEDs 344 travels within the illuminating bar 345 collides with the fluorescent materials dispersed therein, the illuminating bar 345 emits white light. The white light is uniformly emitted from the entire illuminating bar 345 and can be used as a line light source such as CCFL or EEFL. Accordingly, a space that is only used for uniform light distribution in directly arrayed LED structures (what is called a dead space) is not generated in the structure of this embodiment.

In an exemplary embodiment, the cover 346 may have a reflective inner surface. This reflective surface reflects the light emitted from the illuminating bar 345 toward the light guiding plate 342 and unifies the illuminating bar 345 with the light guiding plate 342. Each end of the cover 346 is provided with a wiring slit 3461 for connecting a power supply wire to the LEDs 344. The light guiding plate 342 converts a linear light emitted from the illuminating bar 345 to a planar light.

Figure 5:
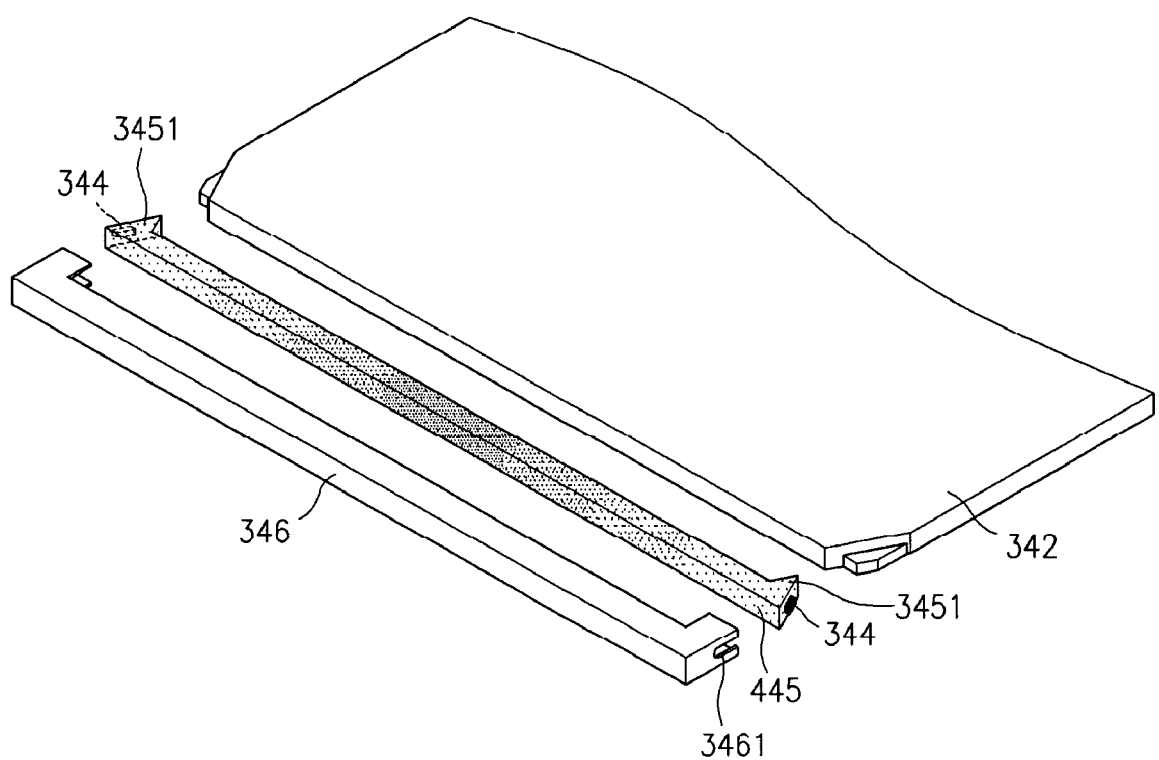
FIG. 5 is an exploded perspective view schematically illustrating another exemplary embodiment of a backlight unit according to the present invention.

FIG. 5 is an exploded perspective view schematically illustrating another exemplary embodiment of a backlight unit according to the present invention.

As compared with the exemplary embodiment shown in FIG. 4, this backlight unit has a different illuminating bar 345.

The illuminating bar 445 of FIG. 5 is configured such that fluorescent materials are most densely concentrated at a central portion thereof, while being more sparsely concentrated in a direction away from the central portion. Such a configuration makes the light concentration in the illuminating bar 445 uniform, since in general the central portion has a smaller amount of light while both the end parts have larger amount of light.

The illuminating bar 445 may be configured such that a slant angle between its one end and its vertical axis satisfies the equation of $\sin^{-1}(S/L)$, where L is a longitudinal length of the illuminating bar 345 and S is a cross-sectional length thereof. This is described in further detail with reference to FIG. 6 below.

Figure 6:
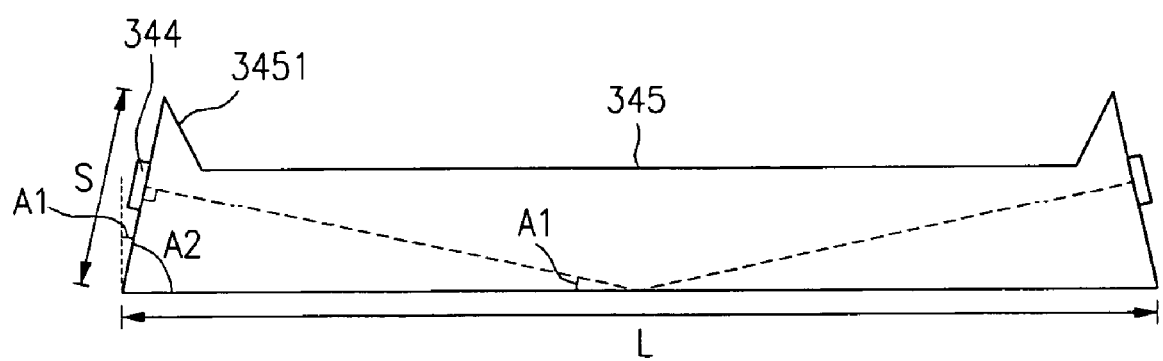
FIG. 6 is a cross-sectional view of an exemplary embodiment of an illumination bar 345 according to the present invention.

FIG. 6 is a cross-sectional view of an exemplary embodiment of an illuminating bar according to the present invention. The illuminating bar in FIG. 6 may be either one in FIG. 4 or in FIG. 5.

In FIG. 6, L is a longitudinal length of the Illumination bar 345, S is a length of an end portion thereof, A1 is a slant angle between the surface of an end portion of the illuminating bar 345 and a vertical axis thereof, and A2 is an angle between the surface of an end portion and a horizontal axis of the illuminating bar 345.

The LEDs 344 are individually provided on the central portions of both the end portions of the illuminating bar 345. When the light emitted from the LEDs 344 passes through the illuminating bar 345, an optimum incident direction of the light for stimulating the fluorescent materials therein is such that the light emitted from the LEDs 344 meets a central portion of the longitudinal side of the cover 346 (FIG. 5). If the slant angle A1 is too large, the light emitted from the LEDs 344 is reflected in multiple directions, generating a light loss and a light-lacking portion. Likewise, if the slant angle A1 is too small, the light emitted from the LEDs 344 does not reach the vicinity of both the end portions.

Continuing now with reference to FIG. 6, the slant angle A1 is calculated by the following equations.

$$(L/2)\sin A1 = S/2 \rightarrow A1 = \sin^{-1}(S/L)$$

Figure 7:
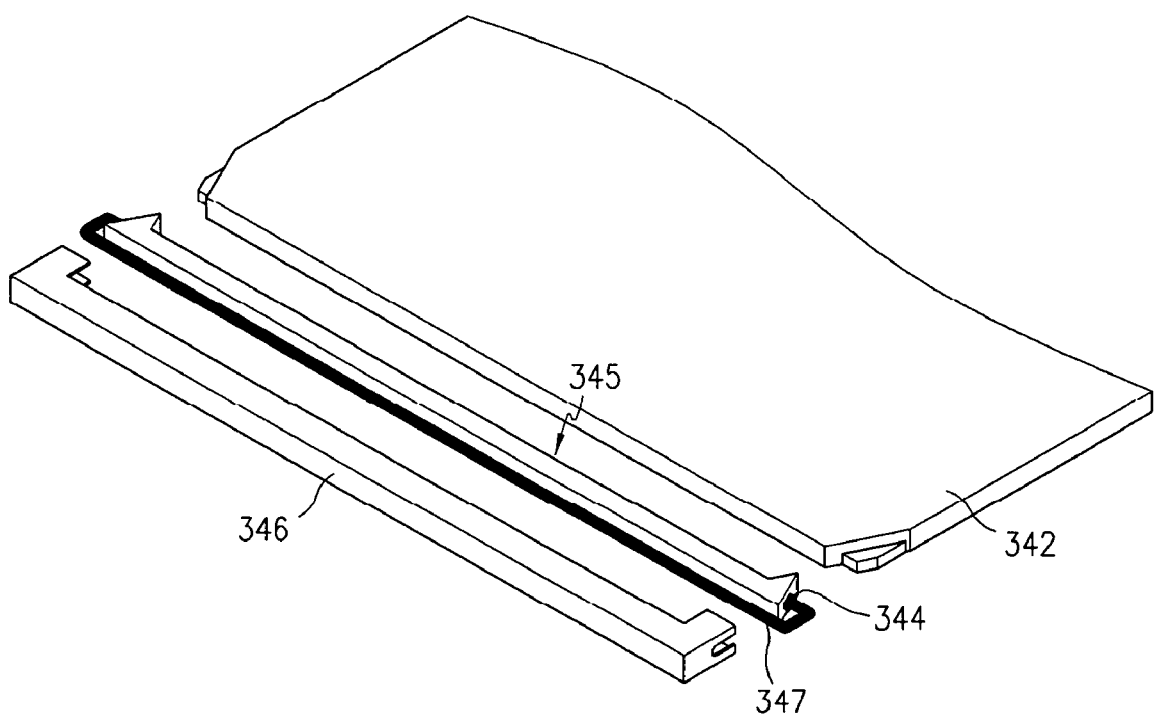
FIG. 7 is an exploded perspective view schematically illustrating still another exemplary embodiment of a backlight unit according to the present invention.
Figure 8:
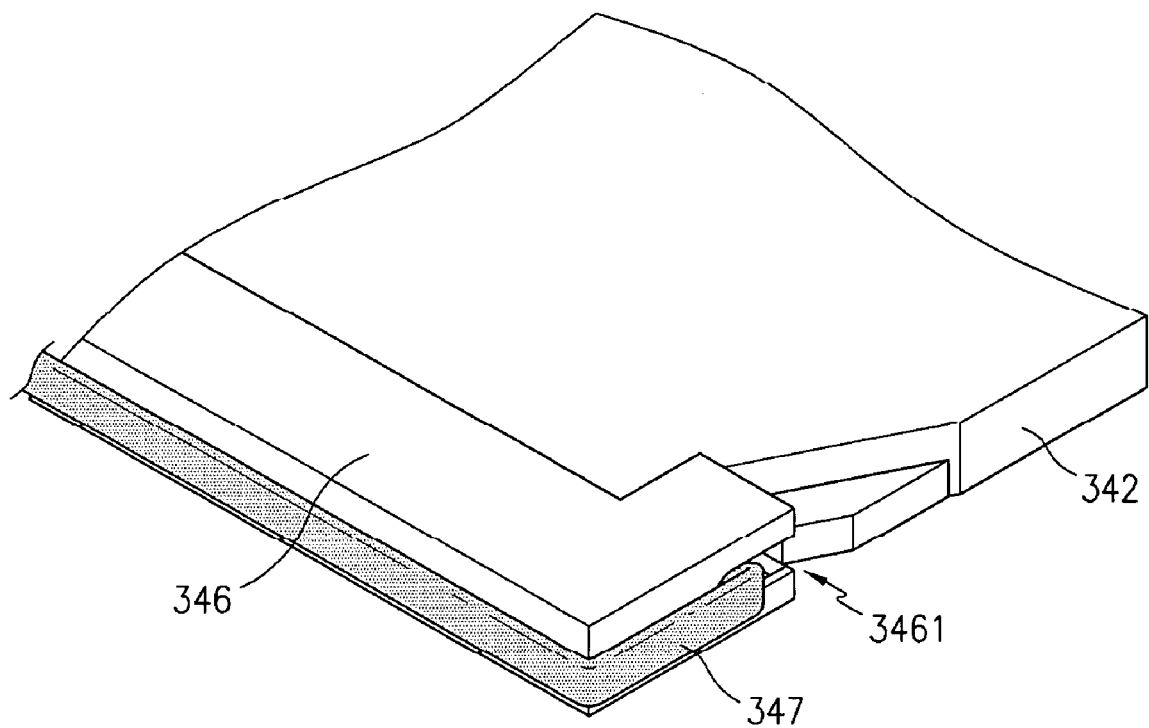
FIG. 8 is a partial exploded perspective view schematically illustrating still another exemplary embodiment of a backlight unit according to the present invention.

Referring to FIG. 7 and FIG. 8, an array of wiring for supplying power to the LEDs is described below.

FIG. 7 is an exploded perspective view schematically illustrating another exemplary embodiment of a backlight unit according to the present invention, and FIG. 8 is a partial exploded perspective view schematically illustrating still another exemplary embodiment of a backlight unit according to the present invention.

In an exemplary embodiment shown in FIG. 7, a wire 347 for supplying power to the LEDs 344 is placed on a side of the illuminating bar 345. The wire 347 is disposed such that when the illuminating bar 345 and the cover 346 are unified, the wire 347 is placed within the cover 346. In an alternative exemplary embodiment, a flexible printed circuit (FPC) may be used as the wire 347.

In the exemplary embodiment shown in FIG. 8, the wire 347 for supplying power to the LEDs 344 is placed on an outer side of the cover 346. In this case, the wire 347 is connected to two LEDs through two wiring slits 3461 that are formed at both the end parts, respectively, of the cover 346. A flexible printed circuit (FPC) may be used as a wire 347.

According to an exemplary embodiment of the present invention, the line light source utilizing the LEDs is obtained. In this line light source device, a space only used for uniformly distributing the light emitted from the LEDs as a point light source, namely, the dead space, is not generated, facilitating the fabrication of compact, slim, and light LCDs.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A line light source for a display device, comprising:
    an illuminating bar that emits light to be used in the display device, the illuminating bar including end portions opposite each other in a longitudinal direction of the illuminating bar, the illuminating bar including an illuminating material; and
    a light emitting diode disposed on each of the end portions of the illuminating bar,
    wherein the end portions of the illuminating bar are each slant with respect to a vertical axis of the illuminating bar at a predetermined slant angle and the illuminating material is more densely concentrated as a distance from the light emitting diode increases, while being more sparsely concentrated at a portion closer to the light emitting diode.

2. The line light source of claim 1, wherein the illuminating material includes fluorescent material.

3. The line light source of claim 1, wherein the illuminating material includes phosphorescent material.

4. The line light source of claim 1, wherein the slant angle between a surface of each end portion of the illuminating bar and the vertical axis of the illuminating bar is obtained by the equation of sin−1 (S/L), where L is a length of the illuminating bar and S is a cross-sectional longitudinal length of the illuminating bar.

5. The line light source of claim 1, wherein the illuminating material is more densely concentrated at a central portion of the illuminating bar, while being more sparsely concentrated in a direction away from the central portion.

6. The line light source of claim 1, wherein the illuminating bar has a shape of a quadrangular pole, the end portions each protruding to have a triangular prism-shaped ear.

7. A line light source comprising:
    an illuminating bar including end portions opposite each other in a longitudinal direction of the illuminating bar, the illuminating bar including a fluorescent material or a phosphorescent material; and
    a light emitting diode disposed on each of the end portions of the illuminating bar,
    wherein the fluorescent or phosphorescent material is more densely concentrated as a distance from the light emitting diode increases, while being more sparsely concentrated at a portion closer to the light emitting diode.

8. The line light source of claim 7, wherein the end portions of the illuminating bar are each slant with respect to a vertical axis of the illuminating bar at a predetermined slant angle.

9. The line light source of claim 7, wherein the slant angle is formed between a surface of each end portion of the illuminating bar and the vertical axis of the illuminating bar and is obtained by the equation of sin−1 (S/L), where L is longitudinal length of the illuminating bar and S is a cross-sectional length of the illuminating bar.

10. A backlight unit comprising:
    an illuminating bar including end portions opposite each other in a longitudinal direction of the illuminating bar, the illuminating bar including a fluorescent material or a phosphorescent material;
    a light emitting diode disposed on each of the end portions of the illuminating bar;
    a cover for receiving the illuminating bar; and
    a light guiding plate disposed adjacent to the illuminating bar, the light guide plate having a side in contact with one side of the illuminating bar,
    wherein the fluorescent or phosphorescent material is more densely concentrated as a distance from the light emitting diode increases, while being more sparsely concentrated at a portion closer to the light emitting diode.

11. The backlight unit of claim 10, further comprising a wire disposed on an outer side of the cover for supplying a power to the light emitting diode.

12. The backlight unit of claim 11, wherein the cover includes at least one wiring slit formed at an end part of the cover, the wire being placed through the wiring slit.

13. The backlight unit of claim 10, wherein the end portions of the illuminating bar are each slant with respect to a vertical axis of the illuminating bar at a predetermined slant angle.

14. The backlight unit of claim 13, wherein the slant angle is formed between a surface of each end portion of the illuminating bar and the vertical axis of the illuminating bar and is obtained by the equation of $\sin^{-1}(S/L)$, where L is a longitudinal length of the illuminating bar and S is a cross-sectional length of the illuminating bar.

15. The backlight unit of claim 10, wherein the fluorescent or phosphorescent material is more densely concentrated at a central portion of the illuminating bar, while being more sparsely concentrated in a direction away from the central portion.

16. The backlight unit of claim 10, wherein the cover reflects the light emitted from the illuminating bar back toward the light guiding plate.

17. The backlight unit of claim 10, wherein the light emitting diode is received within the cover.

18. The backlight unit of claim 10, further comprising a wire for providing a power to the light emitting diode, the wire being disposed within the cover.

* * * * *